No. 624,927. Patented May 16, 1899.
E. GUNNELL.
RIVETING.
(Application filed Apr. 1, 1898.)
(No Model.)

Witnesses.
Wm. W. Rheem
Leonora Wiseman

Inventor.
Elias Gunnell
by Edward Rector
his Atty.

UNITED STATES PATENT OFFICE.

ELIAS GUNNELL, OF CHICAGO, ILLINOIS, ASSIGNOR OF ONE-HALF TO W. IRVING BABCOCK, OF SAME PLACE.

RIVETING.

SPECIFICATION forming part of Letters Patent No. 624,927, dated May 16, 1899.

Application filed April 1, 1898. Serial No. 676,093. (No model.)

*To all whom it may concern:*

Be it known that I, ELIAS GUNNELL, a citizen of the United States, residing at Chicago, in the county of Cook, in the State of Illinois, have invented a certain new and useful Improvement in Riveting, of which the following is a description, reference being had to the accompanying drawings, forming part of this specification.

My invention consists in a novel method and novel means for driving countersunk flush-pointed rivets, by the use of which the operation of driving such rivets may be carried on much more expeditiously and efficiently than heretofore.

The novelty of my invention will be hereinafter set forth, and particularly pointed out in the claims.

Figure 1:
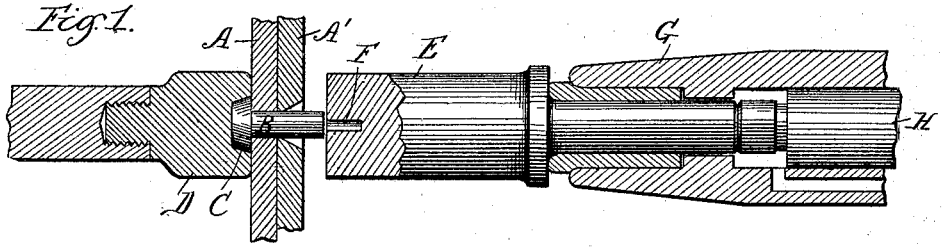
Figure 2:
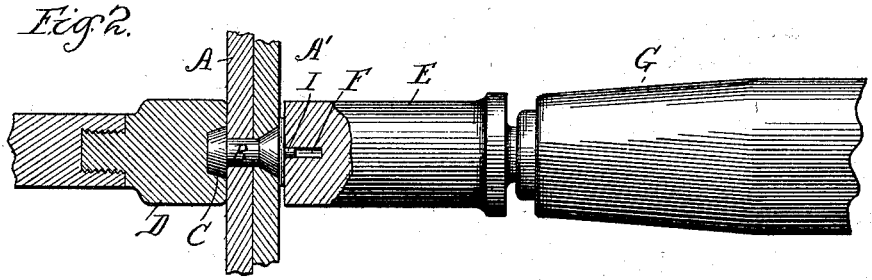
Figure 3:
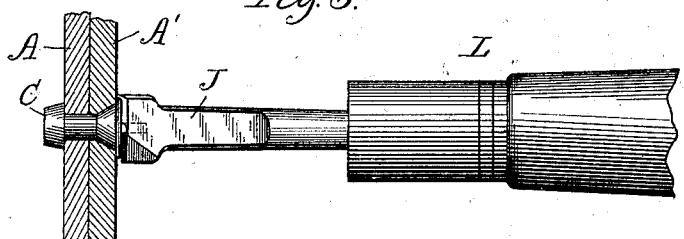
Figure 4:
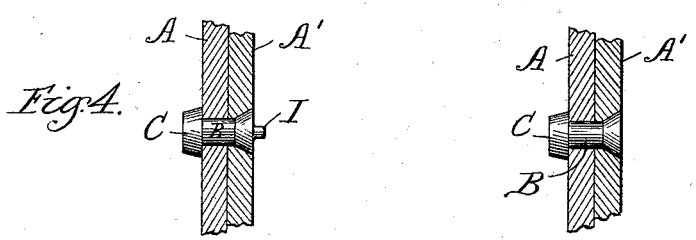
Figure 5:
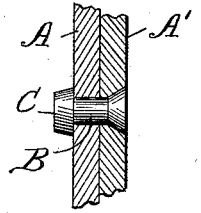
Figure 6:
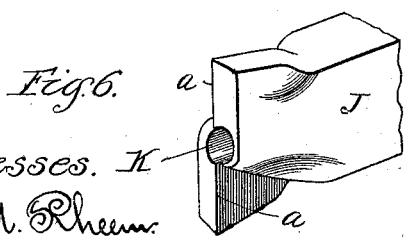

In the accompanying drawings, Figure 1 is a sectional view illustrating two plates to be riveted together with the rivet in position and the devices for "driving" it ready to begin operation. Fig. 2 represents the same parts at the end of the operation of hammering down the end of the rivet. Fig. 3 shows the plates and the rivet of Fig. 2 with the milling-tool applied to the end of the rivet. Fig. 4 shows the plates and the rivet at the end of the operation of the milling-tool. Fig. 5 shows the plates and the rivet when the work is entirely completed, and Figs. 6 are 7 are enlarged detail views of the working end of the milling-tool.

The same letters of reference are used to indicate corresponding parts in the several views.

Heretofore while various mechanical appliances have been devised for driving rivets to take the place of handwork and while what are known as "pneumatic" hammers have been considerably employed as substitutes for hand-hammers it has not been found practicable to use such devices for driving countersunk rivets, particularly what are known as "flush-pointed" countersunk rivets, being rivets whose points—*i. e.*, the end projecting through the countersink in the plate—are flush with the surface of the plate when the work is finished. In driving or "pointing" such a rivet its end has to be battered down with a flat-faced die or hand-hammer, so that the end of the rivet will be spread to properly fill the countersink in the plate, after which the rough portion of the end of the rivet left projecting beyond the surface of the plate is chipped off with a chisel and then the end of the rivet is finished and smoothed with the hand-hammer or die. Owing to the fact that if a die is used it must have a flat face it is extremely difficult to hold it in position against the end of the rivet, since there is nothing to center it and prevent it slipping sidewise. To such an extent is this true that where it has been attempted to use a die at all the die has had to be held in position against the end of the rivet directly by the hands of a workman, while other workmen delivered blows to the die with heavy hand-hammers; but it has not generally been found practicable to use a die at all, and the work of driving such rivets has been almost universally done by means of hand-hammers wielded by skilled workmen and directly striking the end of the rivet, two of such workmen being usually employed on each rivet in order that the blows may be delivered to it rapidly enough to hammer down its end while it remains hot enough for that purpose.

It is the principal object of my invention to devise a method and means for driving these countersunk flush-pointed rivets with pneumatic hammers, by means of which a pneumatic hammer and a single workman may be made to take the place of the two workmen with hand-hammers heretofore necessary and at the same time enable the rivets to be driven much more rapidly and efficiently than heretofore, to which end I have devised both a new method of driving such rivets and novel means for carrying it out.

Such method consists, briefly, in battering down the end of the rivet by means of a flat-faced die, which will form upon it a central projecting teat or stud, which stud will serve to center the die upon the rivet as the work progresses and prevent its displacement, then facing off the head of the rivet flush with the surface of the plate by means of a suitable tool which is centered upon the head of the rivet by the projecting teat or stud, and then cutting off such central stud with a chisel or other suitable tool, thus leaving the rivet with a smooth flat end flush with the surface of the plate.

The novel means which I have devised for carrying out the above-described method consist, first, of a flat-faced die having a central hole by means of which the teat or stud referred to is upset upon the end of the rivet, and, second, of a face milling-tool having a central hole or recess adapted to fit over such stud and center the tool upon the rivet while the end of the latter is being faced off.

Figure 7:
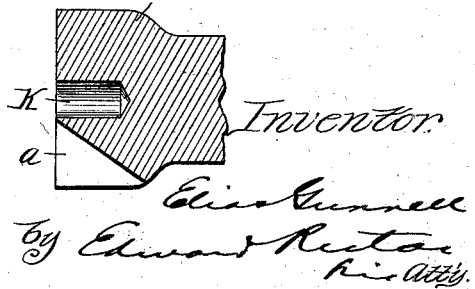

Referring now to the accompanying drawings, A A' represent sections of two plates which are to be riveted together. These plates are provided with coincident holes for the passage of the rivet B, the hole in the plate A' being countersunk, as shown. The rivet B has a finished head C at one end, over which fits the die or button set D of the "holder-on," only the end of which latter is shown, as it may be of any suitable character. Abutting against the opposite projecting end of the rivet is the end of the flat-faced die E, which is provided with a central hole or recess F. The reduced opposite end or stem of the die is shown fitted into the end of a pneumatic hammer G, whose reciprocating piston H operates as a hammer upon the stem of the die. With the parts in the position shown in Fig. 1, motive fluid is admitted to the pneumatic hammer and the die is pressed against the end of the rivet while the piston-hammer delivers its blows. The result of this operation will be that the end of the rivet will be driven down and spread out until the countersink in the plate A' is filled, while the central hole F in the face of the die will cause a central teat or stud I to be upset upon and project from the end of the rivet, as shown in Fig. 2. After this has been done the pneumatic hammer and die E will be removed and the milling-tool shown in Figs. 3, 6, and 7 will be brought into use. This tool J is in the present instance provided at its working end with two diametrically opposite cutters a a, although the arrangement of its cutters may be varied, the essential feature of the tool being that it shall have a central hole or recess K of a size corresponding approximately to the central hole F in the die E, heretofore described, so that it will snugly fit the projecting teat I of the rivet when applied to the latter. The tool J is applied to the end of the rivet, as shown in Fig. 3, and rotated by any suitable power appliance L, a well-known form of rotary pneumatic drill being in practice employed by me. The projecting stud or teat I upon the rivet, fitting in the central hole K in the tool J, serves to center the latter upon the end of the rivet and prevent it becoming displaced from proper position while it is operated to face off the end of the rivet and bring it down flush with the surface of the plate A', as shown in Fig. 4. After this has been done the projecting teat I of the rivet is cut off with a chisel or otherwise removed, leaving the rivet with a countersunk end having a smooth flat surface flush with the surface of the plate A', as shown in Fig. 5.

While, as before stated, the chief object of my invention has been to devise a method and means by the employment of which countersunk rivets might be driven by power appliances more rapidly, cheaply, and efficiently than by handwork, as heretofore, yet it will be understood that the novel method which I have devised does not depend upon the employment of such power devices, but that on the contrary it may be carried out entirely as handwork. It will be further understood that the first step of my new method may be employed independently of the second, the end of the rivet being hammered down by the flat-faced die having the central hole, whereby the projecting teat formed upon the end of the rivet serves to center the die and prevent its displacement as the work progresses, and thereafter cutting off or breaking off the projecting stud and finishing the end of the rivet with a chisel and hand-hammer instead of employing the milling-tool for that purpose.

Having thus fully described my invention, I claim—

1. The herein-described method of driving and finishing countersunk flush-pointed rivets, consisting in hammering down the projecting end of the rivet in such manner as to form upon it a central teat or stud, then facing off the end of the rivet by means of a rotary tool centered upon such projecting teat or stud, and then removing said stud; substantially as described.

2. The herein-described method of driving countersunk flush-pointed rivets, consisting in hammering down the projecting end of the rivet B with a flat-faced die E provided with a central hole F and thereby upsetting upon the end of the rivet a central projecting teat or stud I; then facing off the end of the rivet until it is flush with the surface of the plate, by means of the rotary milling-tool J having the central hole F fitting the projecting stud I; and then removing such projecting stud; substantially as described.

ELIAS GUNNELL.

Witnesses:
  A. PAPPEN,
  C. W. FREY.